(12) United States Patent
Hamada

(10) Patent No.: US 7,946,769 B2
(45) Date of Patent: May 24, 2011

(54) BEARING MECHANISM, SPINDLE MOTOR AND DATA STORAGE MEDIUM DRIVE APPARATUS

(75) Inventor: Katsutoshi Hamada, Kyoto (JP)

(73) Assignee: Nidec Corporation, Kyoto (JP)

( * ) Notice: Subject to any disclaimer, the term of this patent is extended or adjusted under 35 U.S.C. 154(b) by 732 days.

(21) Appl. No.: 12/018,274

(22) Filed: Jan. 23, 2008

(65) Prior Publication Data

US 2008/0181544 A1 Jul. 31, 2008

(30) Foreign Application Priority Data

Jan. 31, 2007 (JP) ................................ 2007-022352

(51) Int. Cl.
*F16C 32/06* (2006.01)
(52) U.S. Cl. ...................................................... 384/107
(58) Field of Classification Search .................. 384/100, 384/107, 112–113, 121; 310/90, 90.5; 29/898.02, 29/898.054
See application file for complete search history.

(56) References Cited

U.S. PATENT DOCUMENTS

| | | | |
|---|---|---|---|
| 6,183,135 B1 * | 2/2001 | Kloeppel et al. | 384/112 |
| 6,375,357 B2 * | 4/2002 | Miura et al. | 384/107 |
| 6,781,266 B2 * | 8/2004 | Le et al. | 310/90 |
| 7,021,829 B2 * | 4/2006 | Tamaoka | 29/898.02 |
| 7,134,791 B2 * | 11/2006 | Yokoo | 384/121 |
| 7,794,151 B2 * | 9/2010 | Neumann | 29/898.054 |
| 2002/0012483 A1 * | 1/2002 | Miura et al. | 384/100 |
| 2004/0218841 A1 * | 11/2004 | Aiello et al. | 384/107 |

FOREIGN PATENT DOCUMENTS

| | | | |
|---|---|---|---|
| DE | 102 39 650 B | * | 3/2004 |
| JP | 09089048 A | * | 3/1997 |
| JP | 2000324753 A | * | 11/2000 |
| JP | 2002-263878 A | | 9/2002 |
| JP | 2006-064041 A | | 3/2006 |
| JP | 2007205370 A | * | 8/2007 |

* cited by examiner

Primary Examiner — Marcus Charles
(74) Attorney, Agent, or Firm — Keating & Bennett, LLP

(57) ABSTRACT

A bearing mechanism includes a shaft, a bearing portion, and a cover closing a bottom end of the bearing portion. The bearing portion and the cover are preferably connected to one another by laser welding. A surface of a welded portion formed by the laser welding includes an inclined surface which is inclined such that the further from a central axis a portion thereof is, the axially higher the portion is. With this unique structure, contamination of lubricant used inside the bearing mechanism by fumes generated due to the laser welding is minimized, and therefore a reliable and durable bearing mechanism is provided.

19 Claims, 16 Drawing Sheets

DIRECTION OF WELDING

DIRECTION OF WELDING

BEARING MECHANISM, SPINDLE MOTOR AND DATA STORAGE MEDIUM DRIVE APPARATUS

BACKGROUND OF THE INVENTION

1. Field of the Invention

The present invention relates to a bearing mechanism, a spindle motor having the bearing mechanism, and a data storage medium drive having the spindle motor.

2. Description of the Related Art

In recent years, an oil bearing or a fluid dynamic pressure bearing is frequently used in a data storage medium drive such as a hard disk drive. Since such bearing mechanisms use lubricant (e.g., lubricating oil) at more than two locations therein, it is critical that the lubricant is retained securely within the bearing mechanism.

In order to securely retain the lubricant within the bearing mechanism, elements included in the bearing mechanism are pressed, fitted, and connected via an adhesive. Also, welding may be used to connect the elements in such a bearing mechanism.

To be more specific, an approximately cylindrical metallic case which accommodates therein a sleeve which supports a rotational axis and a bearing mechanism having a cover to close an opening of the metallic case may be laser welded at the opening of the metallic case and the cover.

Generally, when laser welding is carried out, metallic vapor (hereinafter, fumes) is generated when a weldment is heated to a high temperature and adhered to a welded portion or the like. The fumes include oxidized particles of the weldment, which, when adhered to the welded portion or the like, may fall therefrom due to vibrations or the like. When such particles from the fumes contaminate the lubricant, the bearing mechanism may be damaged. Also, elements having the particles thereon may appear very dark which requires an additional process of removing the particles. Also, the elements having the particles thereon may have reduced anti-corrosion characteristics.

Also, due to thermal strain of the laser welding, the welded portion may be damaged (i.e., cracked) from which the lubricant may leak causing the bearing mechanism to malfunction.

SUMMARY OF THE INVENTION

In order to overcome the problems described above, preferred embodiments of the present invention provide a bearing mechanism including a shaft, a bearing portion, and a cover operable to close a bottom end portion of the bearing portion.

The bearing portion preferably includes a lower inner circumferential surface arranged opposite to an outer circumferential surface of the cover, and a bottom end surface extending continuously from the lower inner circumferential surface and in a radially outward direction, that is, in a direction extending substantially perpendicular to an axis of the shaft.

A fitted portion arranged between the bottom end surface and the cover of the bearing portion preferably includes a welded portion formed of a plurality of beads generated by laser welding the fitted portion. A surface of the welded portion preferably includes an inclined surface inclined such that a radially outer portion thereof is axially higher than the welded portion.

According to the bearing mechanism of a preferred embodiment of the present invention, contamination of lubricant used inside the bearing mechanism by fumes generated due to the laser welding is minimized, and therefore a reliable and durable bearing mechanism is provided.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Figure 1:
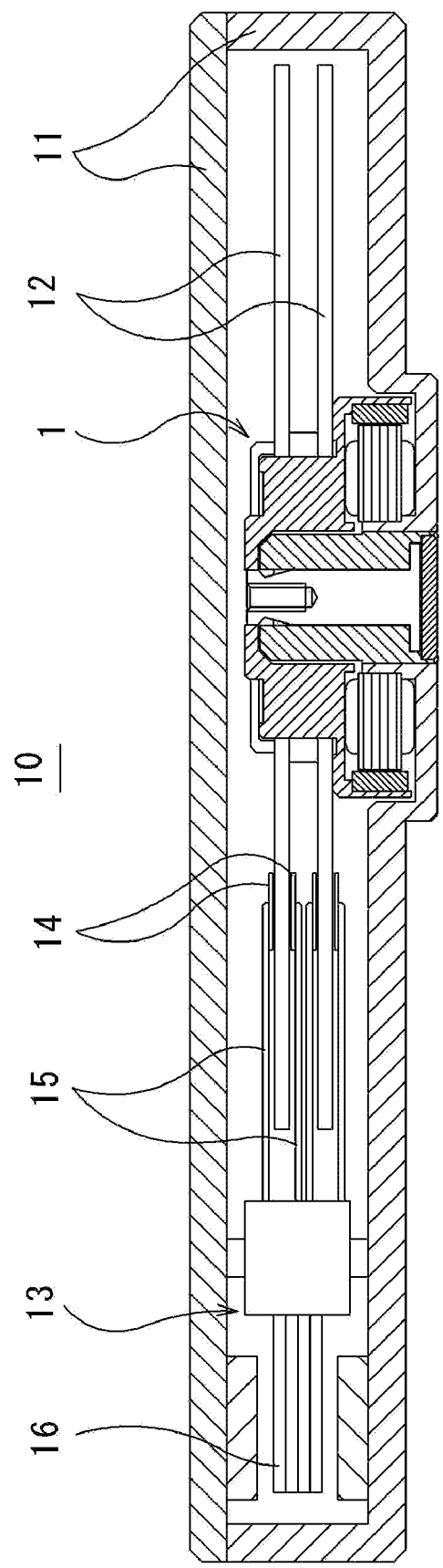
FIG. 1 is a schematic diagram showing a data storage medium drive having a spindle motor according to a first preferred embodiment of the present invention.

Note that in the description of preferred embodiments of the present invention herein, words such as upper, lower, left, right, upward, downward, top, and bottom for describing positional relationships between respective members and directions merely indicate positional relationships and directions in the drawings. Such words do not indicate positional relationships and directions of the members mounted in an actual device. Also note that reference numerals, figure numbers, and supplementary descriptions are shown below for assisting the reader in finding corresponding components in the description of the preferred embodiments below to facilitate an understanding of the present invention. It is understood that these expressions in no way restrict the scope of the present invention.

Hereinafter, a bearing mechanism, a spindle motor having the bearing mechanism, and a data storage medium drive apparatus having the spindle motor will be described with reference to FIGS. 1 to 10.

First Preferred Embodiment

Configuration of the Data Storage Medium Drive

FIG. 1 is a schematic diagram showing a data storage medium drive 10 having a spindle motor according to a first preferred embodiment of the present invention.

The data storage medium drive 10 preferably includes a spindle motor 1, a data storage medium 12, a head moving mechanism 13, and a case 11 which accommodates the spindle motor 1, the data storage medium 12, and the head moving mechanism 13. The case 11 is formed such as not to allow therein foreign particles (i.e., dust). The data storage medium 12 has a substantially discoid shape and is a storage medium in which data is stored and subsequently retrieved therefrom and which is arranged on the spindle motor 1. The head moving mechanism 13 which is a mechanism executing storing and retrieving of data with respect to the data storage medium 12, includes a head 14, an arm 15, and an actuator 16. The head 14 which is arranged at one end of the arm 15 so as be near the data storage medium 12 stores and retrieves data from the data storage medium 12. The arm 15 supports the head 14. The actuator 16 supports one end of the arm 15 so as to move the arm 15. That is, the head 14 is moved to a predetermined position of the data storage medium 12 via the arm 15 by the actuator 16.

Configuration of Spindle Motor

Figure 2:
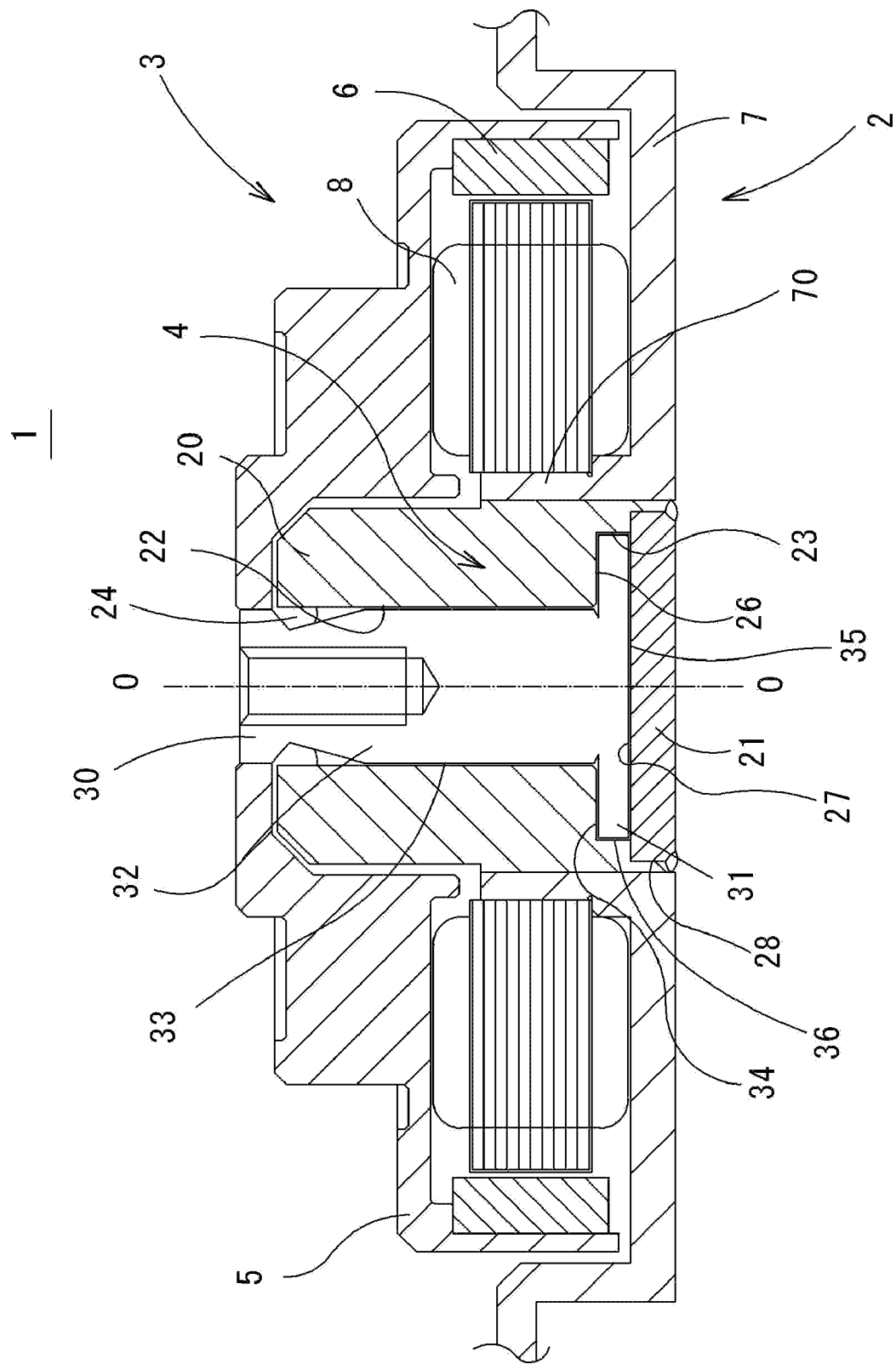
FIG. 2 is a schematic cross-sectional view of a configuration of the spindle motor according to the first preferred embodiment of the present invention.
Figure 3:
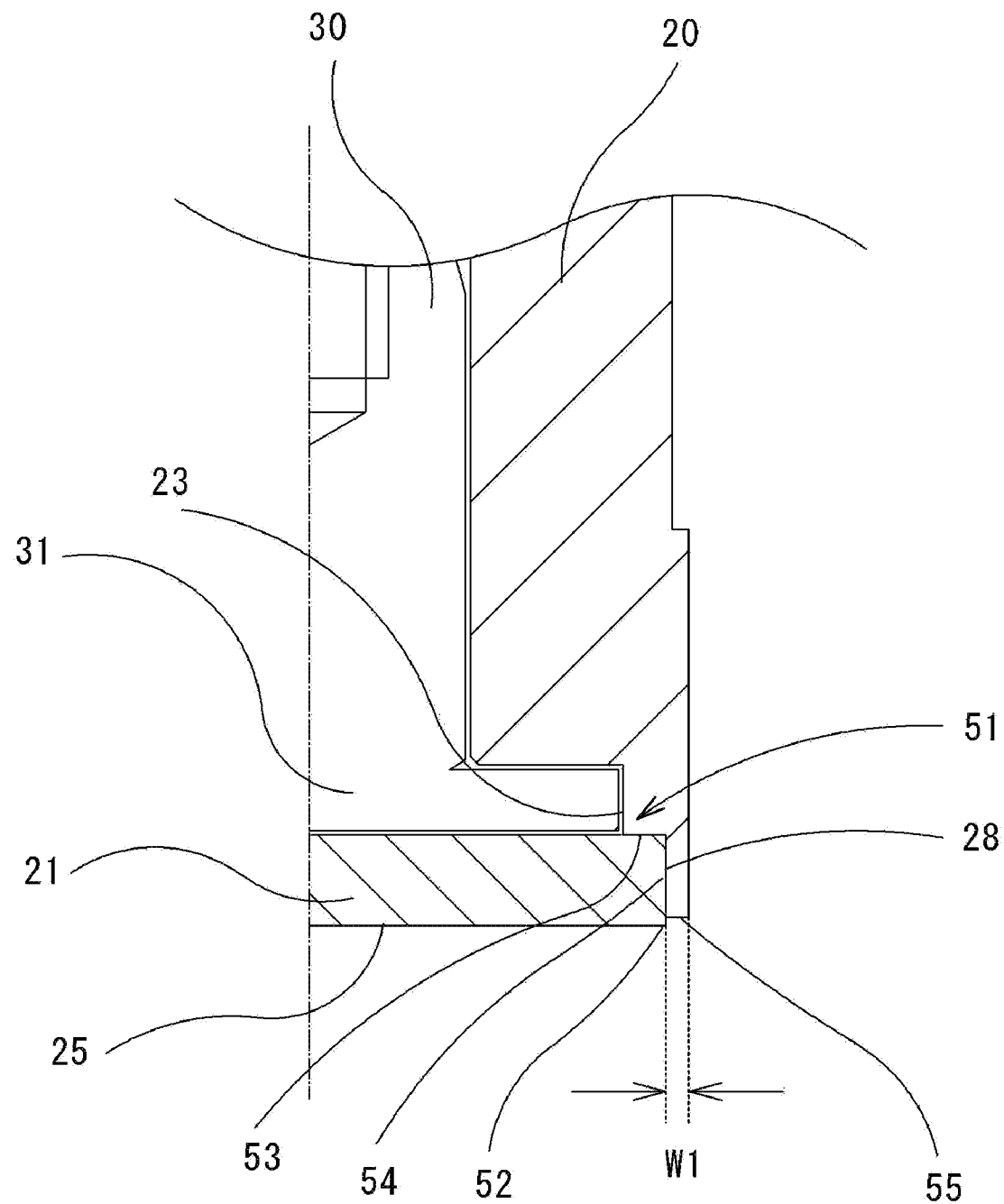
FIG. 3 is an enlarged view of a portion of a bearing mechanism of the spindle motor according to the first preferred embodiment of the present invention.
Figure 4:
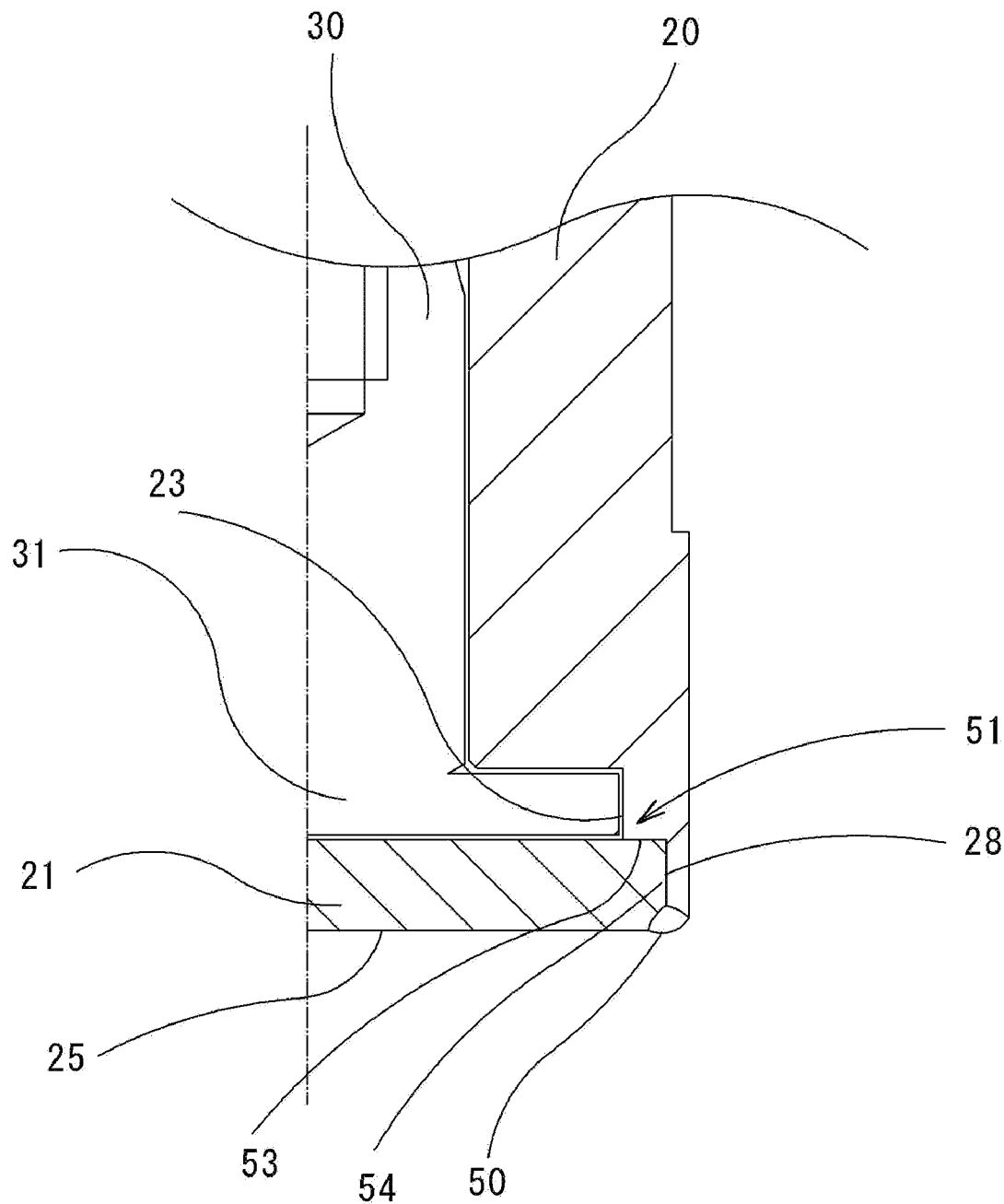
FIG. 4 is an enlarged view of a portion of a welded portion of the bearing mechanism of the spindle motor according to the first preferred embodiment of the present invention.
Figure 5A:
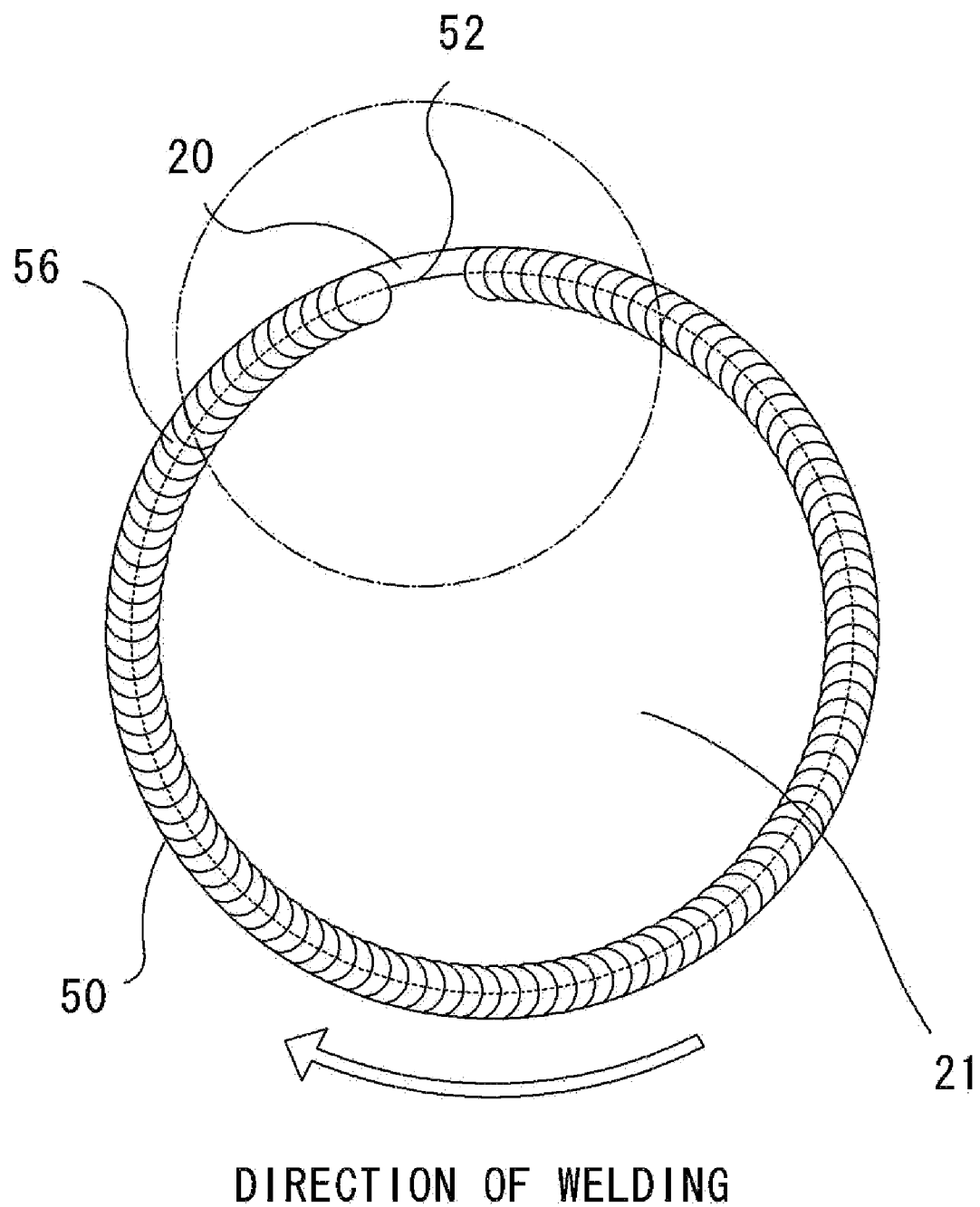
FIG. 5A is a schematic bottom view of the welded portion of the bearing mechanism of the spindle motor according to the first preferred embodiment of the present invention.
Figure 5B:
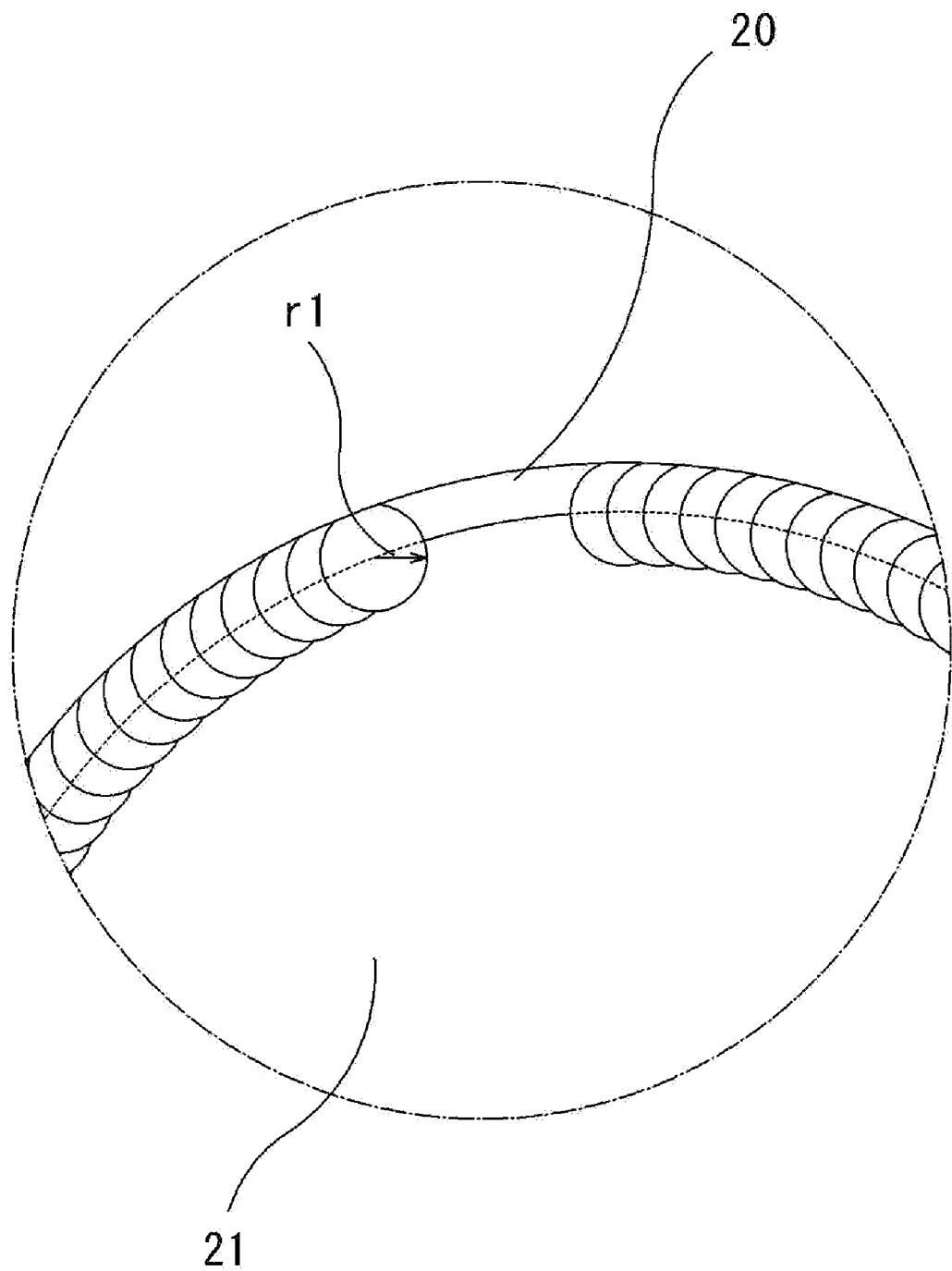
FIG. 5B is an enlarged view of a portion of the welded portion shown in FIG. 5A.

FIG. 2 is a schematic cross-sectional view of a configuration of the spindle motor 1 according to the first preferred embodiment of the present invention. Note that a line 0-0 is a rotational axis of the spindle motor 1.

The spindle motor 1 preferably includes a stator portion 2 which is secured to a base portion 7, and a rotor portion 3 which is rotatably supported via a bearing mechanism 4 by the stator portion 2.

Stator Portion

The stator portion 2 preferably supports the base portion 7 and a stator 8 which is secured to the base portion 7. To be more specific, the base portion 7 includes a cylindrical portion 70 extending axially upwardly from an edge of a central opening thereof, and the stator 8 is affixed at an outer circumference of the cylindrical portion 70.

Rotor Portion

The rotor portion 3 is preferably rotatably supported by the stator portion 2 via the bearing mechanism 4, and preferably includes a rotor hub 5 around which the data storage medium 12 is arranged, and a rotor magnet 6 arranged radially opposite from an inner circumferential surface of the rotor hub 5.

To be more specific, the rotor magnet 6 is attached, preferably by press fitting or by an adhesive, to an inner circumferential surface of a cylindrical portion of the rotor hub 5. The rotor magnet 6 is arranged radially opposite from the stator 8 via a gap therebetween. When electricity is conducted to the stator 8, electromagnetic interaction between the stator 8 and the rotor magnet 6 generates a torque at the rotor portion 3.

Configuration of the Bearing Mechanism

The bearing mechanism 4 is a fluid dynamic pressure bearing supporting the rotor portion 3 in a rotatable manner with respect to the stator portion 2 via a lubricant (lubricating oil in the present preferred embodiment). The bearing mechanism 4 preferably includes a sleeve 20 as a bearing portion, a cover 21 secured at a lower portion of the sleeve 20, and a shaft 30.

The sleeve 20 preferably has a substantially cylindrical shape including a through hole 24 arranged at a central portion thereof. An inner circumferential surface of the through hole 24 of the sleeve 20 preferably includes a first radial inner circumferential surface 22, and a second radial inner circumferential surface 23 which is arranged axially lower than the first radial inner circumferential surface 22 and whose diameter is greater than that of the first radial inner circumferential surface 22. The cover 21 is arranged at a bottom end of the through hole 24 of the sleeve 20 so as to cover the bottom end of the through hole 24. Note that the cover 21 and the sleeve 20 are preferably connected to one another by laser welding wherein a welded portion 50 (described below) is formed at a portion connecting the cover 21 and the sleeve 20.

The shaft 30 is preferably inserted into the through hole 24 of the sleeve 20. An upper end portion of the shaft 30 is fitted to a central hole of the rotor hub 5. The shaft 30 preferably includes a thrust flange 31 at a bottom end portion thereof in an integral manner. That is, the shaft 30 includes a shaft body 32 of a substantially cylindrical shape and the thrust flange 31.

The thrust flange 31 preferably includes a substantially annular shape extending outwardly in a radial direction at a bottom portion of the outer circumferential surface 33 of the shaft body 32. The thrust flange 31 preferably includes a first thrust surface 34 facing upwardly in the axial direction, a second thrust surface 35 facing downwardly in the axial direction, and an outer circumferential surface 36 arranged to connect the first thrust surface 34 and the second thrust surface 35.

Also, the bearing mechanism 4 preferably includes a radial bearing portion according to the present preferred embodiment and a thrust bearing portion according to the present preferred embodiment. The radial bearing portion preferably includes the first radial inner circumferential surface 22 of the sleeve 20, the outer circumferential surface 33 of the shaft body 32, and the lubricating oil.

The thrust bearing portion according to the present preferred embodiment preferably includes a thrust surface 26 which is arranged to connect the first radial inner circumferential surface 22 and the second radial inner circumferential surface 23 of the sleeve 20, the first thrust surface 34 of the thrust flange 31, and the lubricating oil retained therebetween. Also, the thrust bearing portion according to the present preferred embodiment preferably includes a thrust surface 27 of the cover 21 arranged opposite to the second thrust surface 35, the second thrust surface 35, and the lubricating oil retained therebetween.

Welded Portion

Hereinafter, the welded portion 50 will be described with reference to FIGS. 3, 4, 5A, 5B, and 8.

The welded portion 50 preferably includes a fitted portion 52 which is formed by fitting the cover 21 to a step portion 51 arranged at the axially bottom portion of the sleeve 20 and which is preferably laser welded. The step portion 51 is a concave portion arranged axially below and continuous with the second radial inner circumferential surface 23 of the sleeve 20 so as to secure the cover 21. The step portion 51 preferably includes an end surface 53 which is arranged facing downward in the axial direction and which is a substantially annular shaped surface, a lower inner circumferential surface 54 having a diameter greater than that of the second radial inner circumferential surface 23, and a bottom end surface 55. The lower inner circumferential surface 54 is a surface having a substantially cylindrical shape extending in the axial direction from the end surface 53. The bottom end surface 55 is a surface having a substantially annular shape extending in the radially outward direction from the lower inner circumferential surface 54.

The end surface 53 of the sleeve 20 makes contact with the thrust surface 27 of the cover 21. Also, the outer circumferential surface 28 of the cover 21 makes contact with the lower inner circumferential surface 54 of the sleeve 20. The fitted portion 52 is laser welded so as to form the welded portion 50.

It is to be appreciated that the preferred method of laser welding is more effective compared with other methods of welding (e.g., arc welding and resistance welding) in order to achieve a secure connection without generating excessive heat. Also, laser welding requires no vacuum device and is, therefore, very suitable for welding to connect the sleeve 20 and the cover 21.

The welded portion 50 is formed along an outer circumferential edge of the cover 21 so as to minimize oil leakage of the lubricating oil from a gap between the sleeve 20 and the cover 21. A shielding gas (argon gas in the present preferred embodiment) for preventing oxidation and for cooling of the welded portion 50 is preferably sprayed thereon during and after the welding is carried out. Note that although the present preferred embodiment uses argon gas as the shielding gas, helium which has a high cooling efficiency or nitrogen base gas which may be obtained inexpensively may be used.

Figure 10:
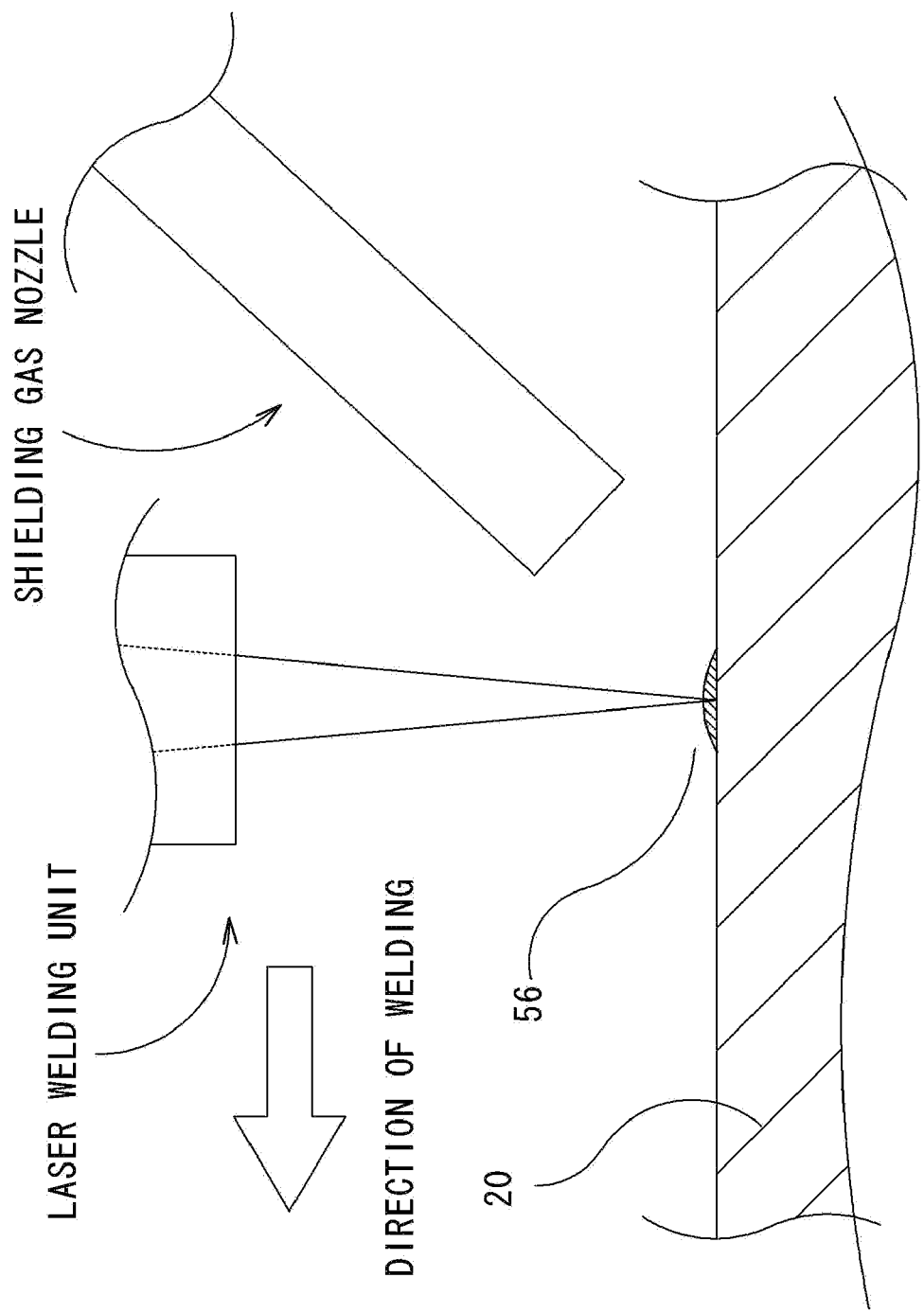
FIG. 10 is a schematic diagram showing a direction in which a shielding gas is sprayed according to the first preferred embodiment of the present invention.

According to the present preferred embodiment, the bottom end surface 55 of the sleeve 20 is arranged axially above a bottom surface 25 of the cover 21. Also, a radial width W1 of the bottom end surface 55 of the sleeve 20 is preferably smaller than a distance (see r1 in FIG. 5B) between a substantially central portion of a bead 56 and an edge thereof, wherein the substantially central portion of the bead 56 is arranged at the fitted portion 52, and at least a portion of the bead 56 makes contact with the outer circumferential edge of the sleeve 20. A series of the beads 56 is continuously arranged at the bottom end surface 55 of the sleeve 20. Also, it is to be noted that the shielding gas is sprayed toward the portion being welding such that the portion being welded is ahead of a sprayer of the shielding gas with respect to a direction of the welding as shown in FIG. 10. (It should be noted that FIG. 10 is, for clarity purposes, depicted upside down in the axial direction with respect to, for example, FIG. 1). That is, the shielding gas is sprayed at the portion of welding in a direction following the welding.

By virtue of such a welding method, at least a portion of the bead 56 is arranged to make contact with the outer circumferential edge of the sleeve 20, and the welded portion 50 formed by the bead 56 includes an inclined surface inclined such that the radially outer portion is the axially higher portion. Consequently, the fumes which are generated by the laser welding flow radially outwardly from the sleeve 20, and therefore are less likely to adhere to the sleeve 20 and the cover 21 at the radially inward portion thereof. Also, since the weldment is ahead of the sprayer of the shielding gas with respect to the direction of welding, the bead 56 covers the fumes adhered on the sleeve 20 or the cover 21 so that the particles from the fumes will not fall due to vibrations or the like. Also, since the bottom end surface 55 of the sleeve 20 is arranged axially above the bottom surface 25 of the cover 21 (i.e., the fitted portion 52 includes an axial step), the bead 56 includes a substantially convex shape making the bead 56 shock resistant. By this, the welded portion 50 possesses a strong connecting force and is resistant to shocks and vibration.

By virtue of such a configuration, the data storage medium drive 10 according to the present preferred embodiment provides a bearing mechanism which has less contamination problems of the lubricant caused by the fumes, minimizes oil leakage from the welded portion 50, and is durable and reliable.

Second Preferred Embodiment

Hereinafter, a second preferred embodiment of the present invention will be described with reference to FIGS. 6 to 10. Note that FIGS. 6 to 10 generally correspond to FIGS. 2 to 5 showing the first preferred embodiment of the present invention. Elements of the second preferred embodiment similar to those described for the first preferred embodiment will be assigned similar reference numerals (e.g., a spindle motor according to the second preferred embodiment will be referred to as spindle motor 101, etc.), and a description thereof is omitted.

Configuration of Spindle Motor

Figure 6:
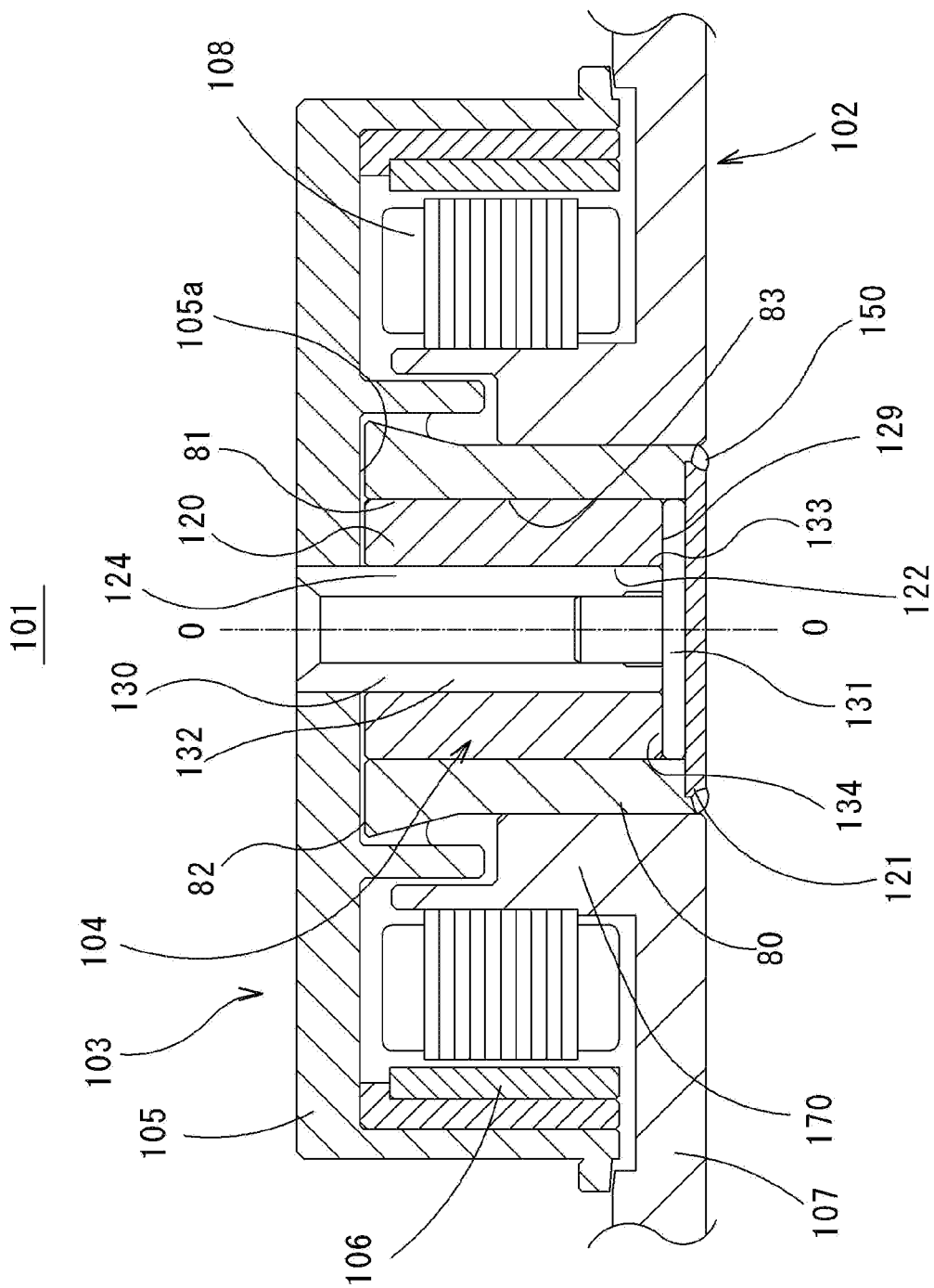
FIG. 6 is a schematic cross-sectional view of a spindle motor according to a second preferred embodiment of the present invention.
Figure 7:
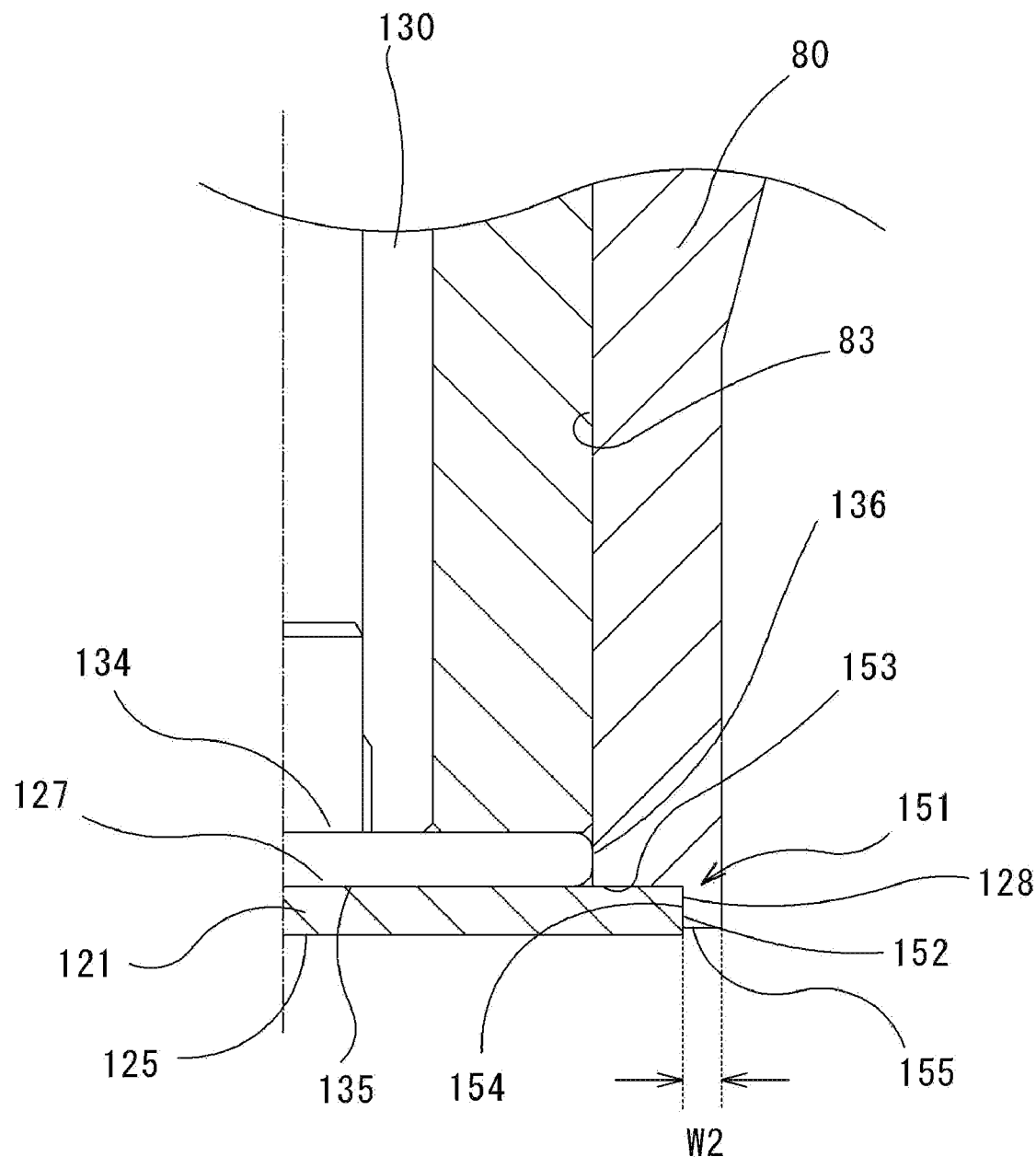
FIG. 7 is an enlarged view of a bearing mechanism of the spindle motor according to the second preferred embodiment of the present invention.
Figure 8:
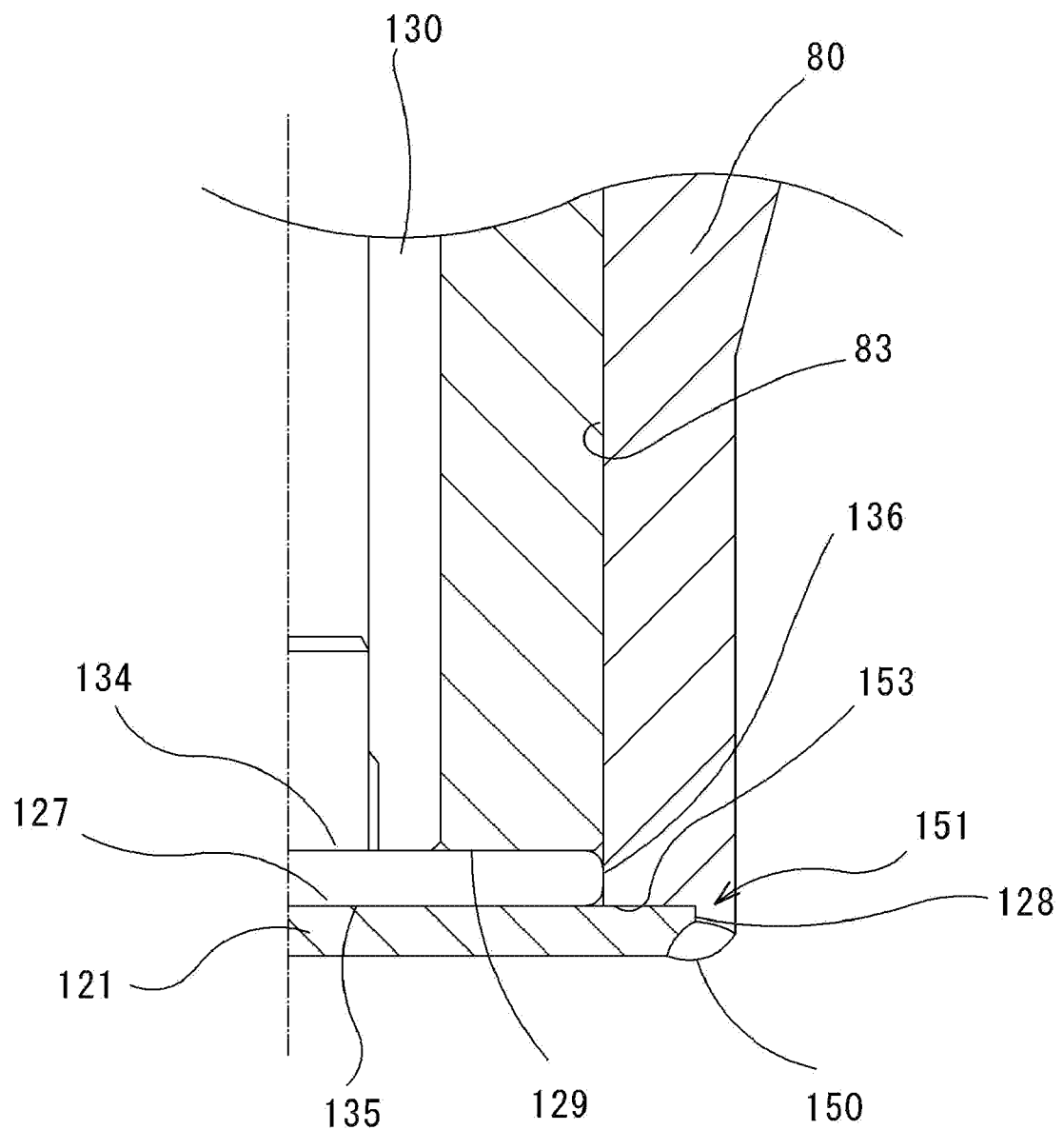
FIG. 8 is an enlarged view of a welded portion of the bearing mechanism of the spindle motor according to the second preferred embodiment of the present invention.
Figure 9A:
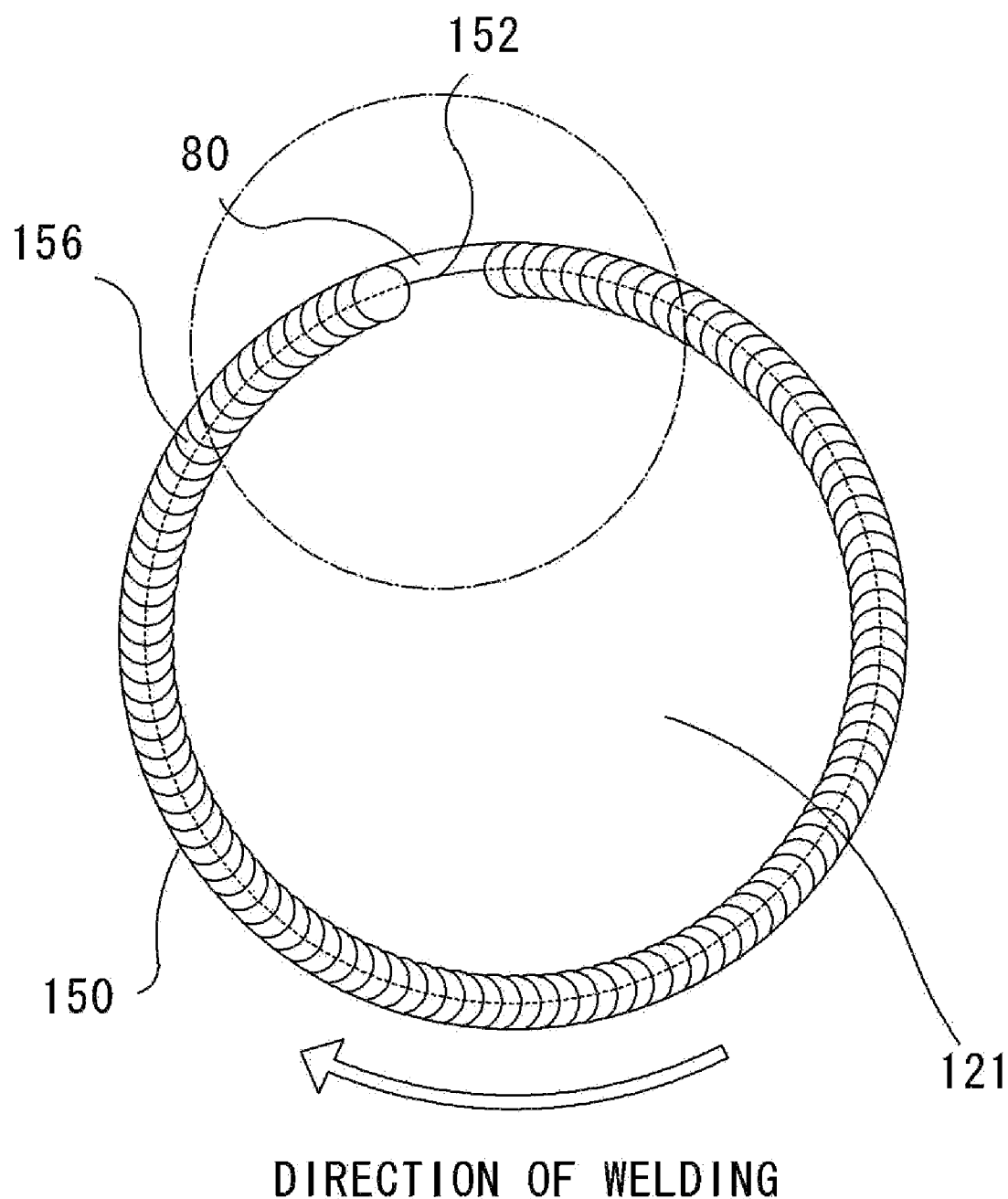
FIG. 9A is a schematic bottom view of the welded portion of the bearing mechanism of the spindle motor according to the second preferred embodiment of the present invention.
Figure 9B:
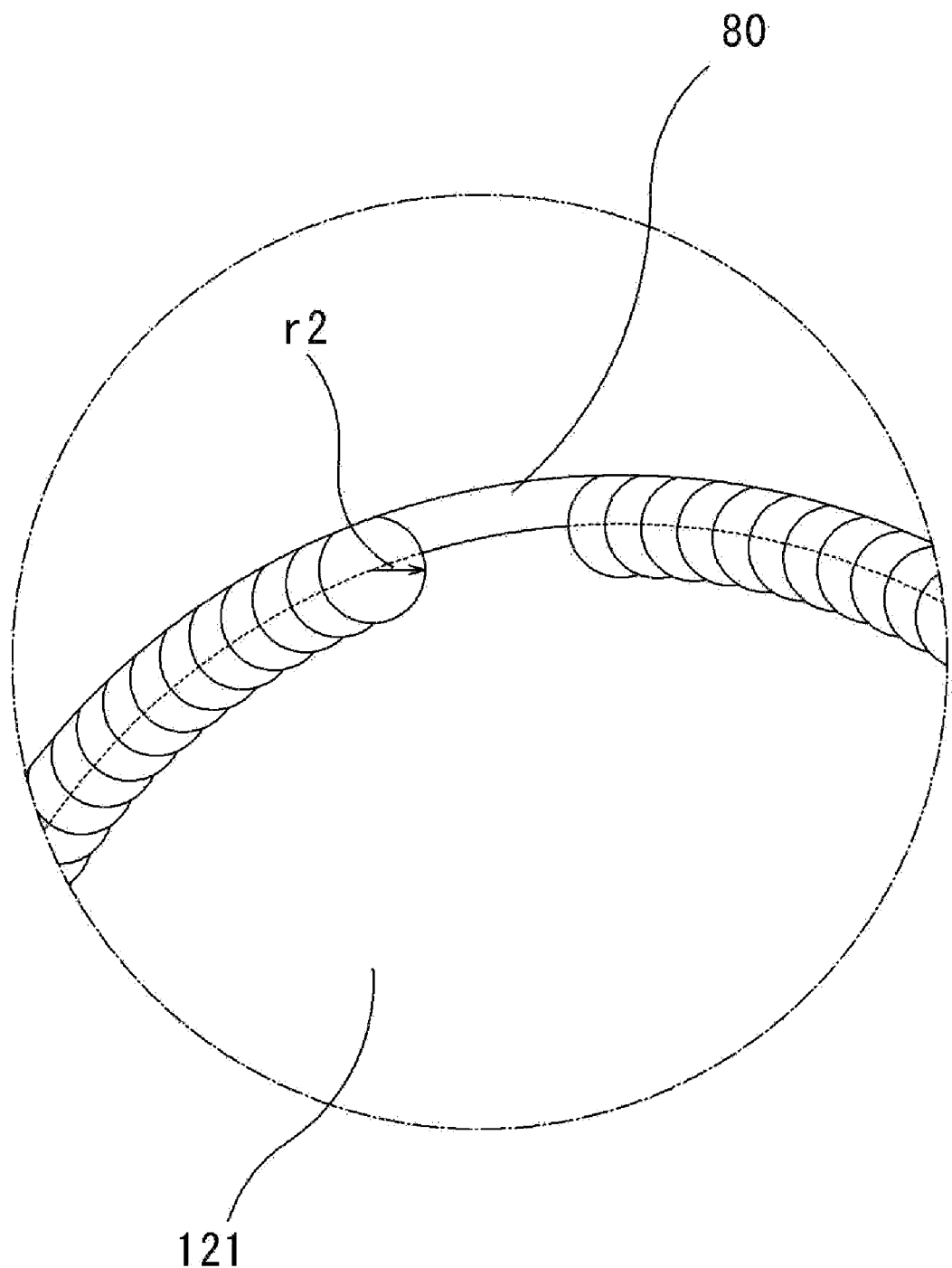
FIG. 9B is an enlarged view of a portion of the welded portion shown in FIG. 9A.

FIG. 6 is a schematic cross-sectional view of the spindle motor 101 according to the second preferred embodiment of the present invention. Note that a line 0-0 shown in FIG. 6 is a rotational axis of the spindle motor 101.

The spindle motor 101 preferably includes a stator portion 102 which is secured to a base portion 107, and a rotor portion 103 which is rotatably supported by the stator portion 102 via a bearing mechanism 104.

Stator Portion

The stator portion 102 preferably includes the base portion 107, and a stator 108 which is secured to the base portion 107. To be more specific, the base portion 107 includes a cylindrical portion 170 extending axially upwardly from an edge of a central opening thereof, and the stator 108 is affixed at an outer circumference of the cylindrical portion 170.

Rotor Portion

The rotor portion 103 is preferably rotatably supported by the stator portion 102 via the bearing mechanism 104, and preferably includes a rotor hub 105 around which the data storage medium 12 is arranged and a rotor magnet 106 arranged at an inner circumferential surface of the rotor hub 105.

To be more specific, the rotor magnet 106 is attached by pressing or adhesive at an inner circumferential surface of the inner circumferential surface of the rotor hub 105. The rotor magnet 106 is arranged radially opposite from the stator 108 via a gap therebetween. When electricity is conducted to the stator 108, electromagnetic interaction between the stator 108 and the rotor magnet 106 generates a torque at the rotor portion 103.

Configuration of the Bearing Mechanism

The bearing mechanism 104 is a fluid dynamic pressure bearing supporting the rotor portion 103 in a rotatable manner with respect to the stator portion 102 via the lubricant (lubricating oil in the present preferred embodiment). The bearing mechanism 104 preferably includes a housing 80 and a sleeve 120 as a bearing portion. Also, the bearing mechanism 104 preferably includes a cover 121 secured at the lower portion of the housing 80, and a shaft 130.

The housing 80 preferably has a substantially cylindrical shape including a through hole 81 arranged at a central portion thereof in the axial direction. An inner circumferential surface 83 of the through hole 81 of the housing 80 and an outer circumferential surface of the sleeve 120 are fitted and secured to one another by any suitable method, such as by an adhesive. That is, according to the present preferred embodiment, the bearing portion includes the housing 80 and the sleeve 120. The sleeve 120 preferably has a substantially cylindrical shape including a through hole 124 arranged at a central portion thereof. The through hole 124 of the sleeve 120 preferably includes a radial inner circumferential surface 122. The cover 121 is arranged at a bottom end of the through hole 81 of the housing 80 so as to cover the bottom end of the through hole 81. Note that the cover 121 and the housing 80 are preferably connected to one another by laser welding wherein a welded portion 150 (described below) is formed at a portion connecting the cover 121 and the housing 80.

The shaft 130 is preferably inserted into the through hole 124 of the sleeve 120. An upper end portion of the shaft 130 is fitted to a central hole of the rotor hub 105. The shaft 130 preferably includes a thrust flange 131 at a bottom end thereof in an integral manner. That is, the shaft 130 includes a shaft body 132 having a substantially cylindrical shape and the thrust flange 131.

The thrust flange 131 preferably includes a substantially annular shape extending outwardly in the radial direction at a bottom portion of the outer circumferential surface 133 of the shaft body 132. The thrust flange 131 preferably includes a first thrust surface 134 arranged at an axial upper side surface thereof, a second thrust surface 135 facing downwardly in the axial direction, and an outer circumferential surface 136 arranged to connect the first thrust surface 134 and the second thrust surface 135.

Also, the bearing mechanism 104 preferably includes a radial bearing portion according to the present preferred embodiment and a thrust bearing portion according to the present preferred embodiment. The radial bearing portion preferably includes the radial inner circumferential surface 122 of the sleeve 120, the outer circumferential surface 133 of the shaft body 132, and the lubricating oil.

The thrust bearing portion according to the present preferred embodiment preferably includes a top end surface 82 of the housing 80, an upper wall portion 105a of the rotor hub 105, and the lubricating oil retained therebetween. Also, the thrust bearing portion according to the present preferred embodiment includes a bottom end surface 129 of the sleeve 120, the first thrust surface 134 of the thrust flange 131, and the lubricating oil retained therebetween.

Welded Portion

Hereinafter, the welded portion 150 according to the second preferred embodiment will be described with reference to FIGS. 7 to 10.

The welded portion 150 preferably includes a fitted portion 152 which is formed by fitting the cover 121 to a step portion 151 arranged at an axial bottom portion of the housing 80 and which is preferably laser welded.

The step portion 151 which is a substantially annular concave portion arranged to secure the cover 121 preferably includes an end surface 153, a lower inner circumferential surface 154 which has a diameter greater than that of the inner circumferential surface 83 of the housing 80, and a bottom end surface 155. The end surface 153 extends radially outwardly and is preferably connected to the inner circumferential surface 83 of the housing 80. The lower inner circumferential surface 154 preferably has a substantially cylindrical shape and extends from a radially outer end of the end surface 153 in the axially downward direction. The bottom end surface 155 has a substantially annular shape extending radially outwardly and is preferably connected to a bottom end of the lower inner circumferential surface 154.

The end surface 153 of the housing 80 makes contact with a thrust surface 127 of the cover 121. Also, an outer circumferential surface 128 of the cover 121 makes contact with the lower inner circumferential surface 154 of the step portion 151. The fitted portion 152 is preferably laser welded so as to form the welded portion 150.

According to the present preferred embodiment, the bottom end surface 155 of the housing 80 is arranged axially above a bottom surface 125 of the cover 121. Also, a radial width W2 (see FIG. 7) of the bottom end surface 155 of the housing 80 is smaller than a distance (see r2 in FIG. 9B) between a substantially central portion of a bead 156 and an edge thereof, wherein the substantially central portion of the bead 156 is arranged at the fitted portion 152, and at least a portion of the bead 156 makes contact with the outer circumferential edge of the housing 80. A series of the beads 156 is continuously arranged at the bottom end surface 155 of the housing 80. Also, it is to be noted that the shielding gas is sprayed to the portion being welding such that the portion being welded is ahead of a sprayer of the shielding gas with respect to a direction of the welding.

It is to be noted that effects achieved by the second preferred embodiment are similar as those achieved by the first preferred embodiment of the present invention.

While the preferred embodiments of the present invention have been described in detail, it is to be understood that the foregoing description is in all aspects illustrative and not restrictive. It is understood that numerous other modifications and variations can be devised without departing from the scope of the invention.

For example, although the preferred embodiments described above assume that the bearing mechanism is a fluid dynamic pressure bearing, the present invention is not limited thereto.

For example, the substantially central portion of the bead 56 may be arranged at the bottom end surface 55 of the sleeve 20. Also, the substantially central portion of the bead 156 may be arranged at the bottom end surface 155 of the housing 80.

For example, although the preferred embodiments described above assume that the bearing mechanism includes a rotatable shaft, the present invention is not limited thereto. The present invention may include a fixed shaft.

Figure 11:
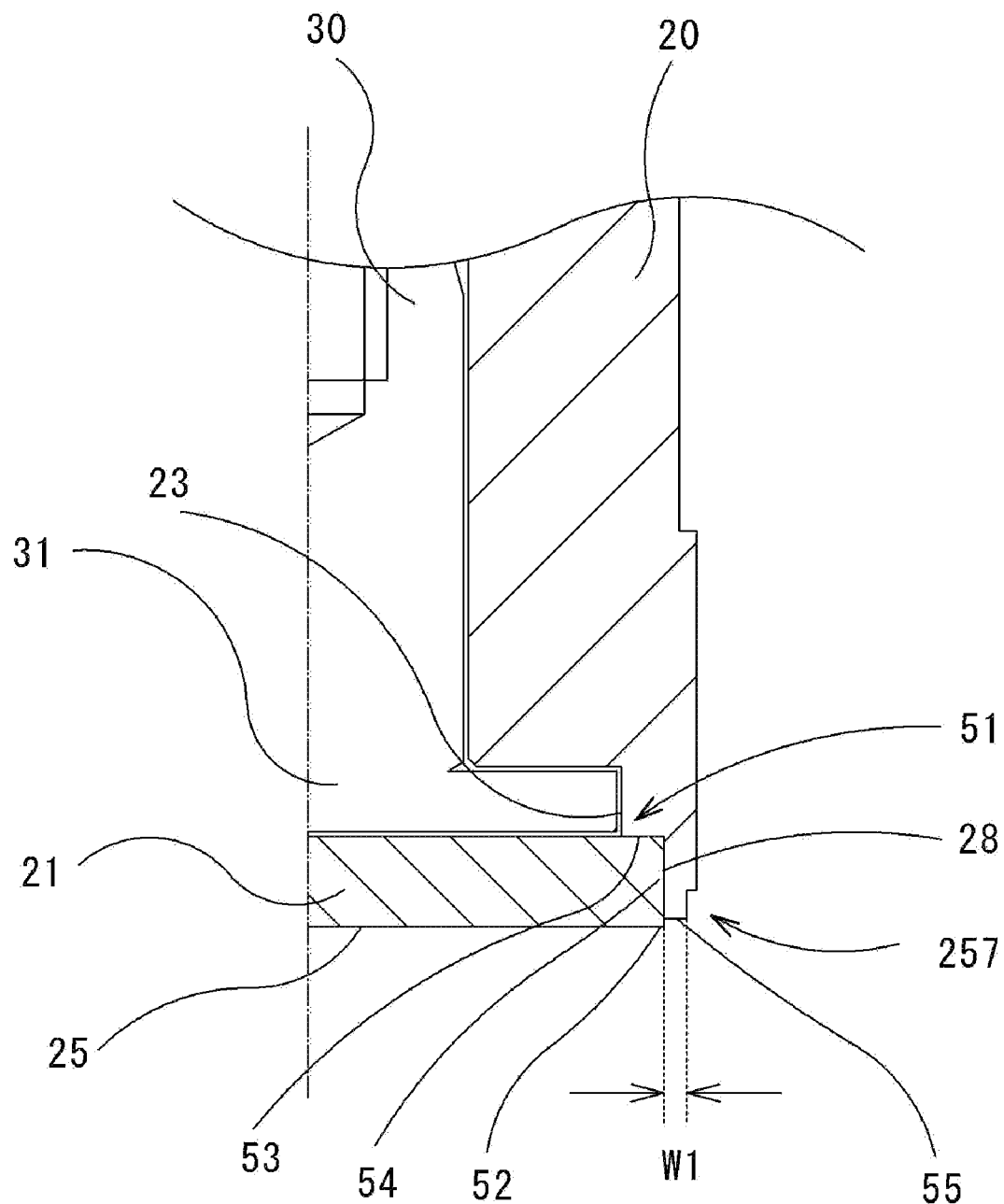
FIG. 11 is an enlarged view of a first modification of the bearing mechanism of the spindle motor according to the first preferred embodiment of the present invention.
Figure 12:
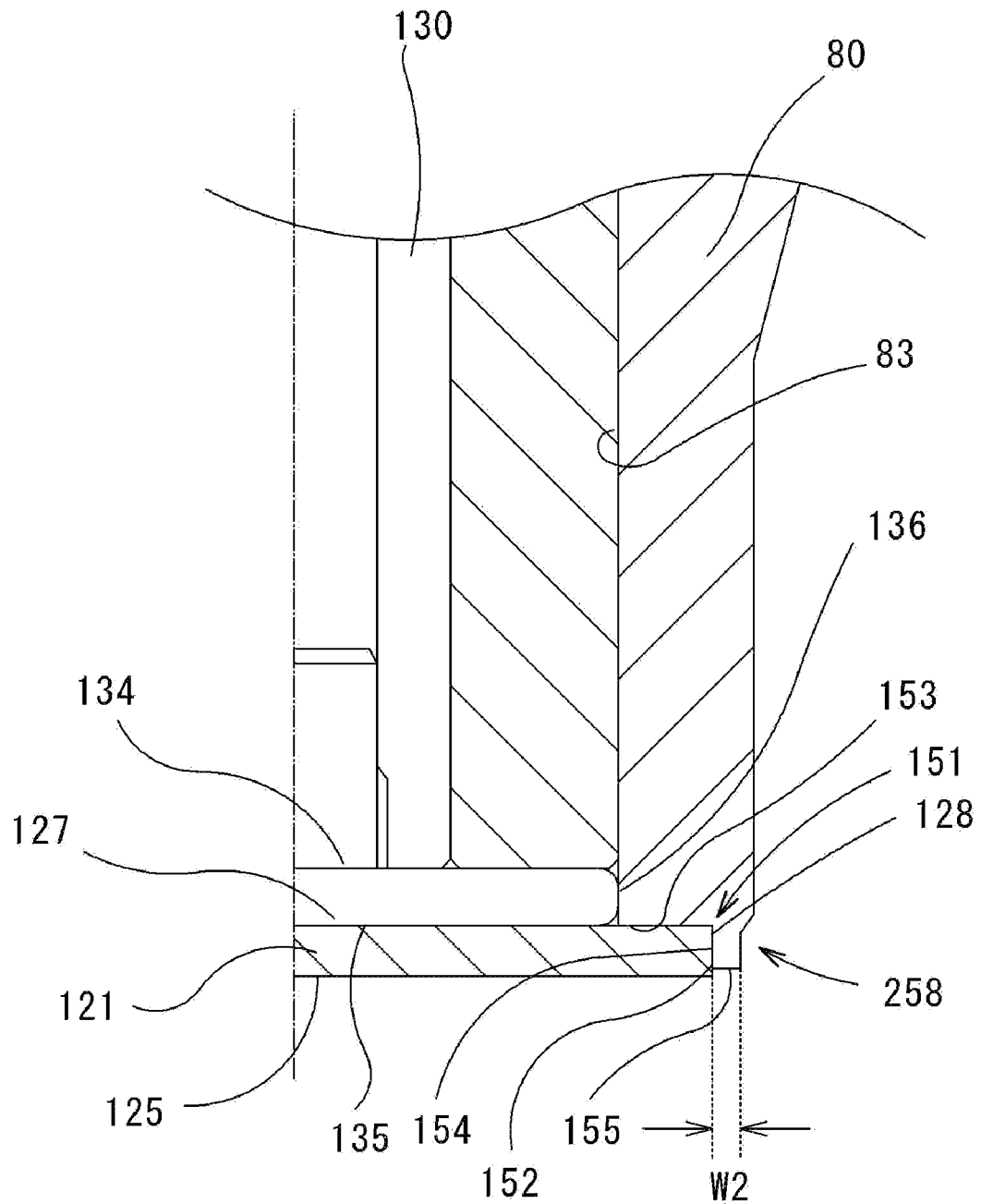
FIG. 12 is an enlarged view of a first modification of the bearing mechanism of the spindle motor according to the second preferred embodiment of the present invention.

Also, the bearing portion according to the first and second preferred embodiments of the present invention may include at an axially lower portion thereof a notched portion 257 and a notched portion 258, respectively as shown in FIGS. 11 and 12.

Figure 13:
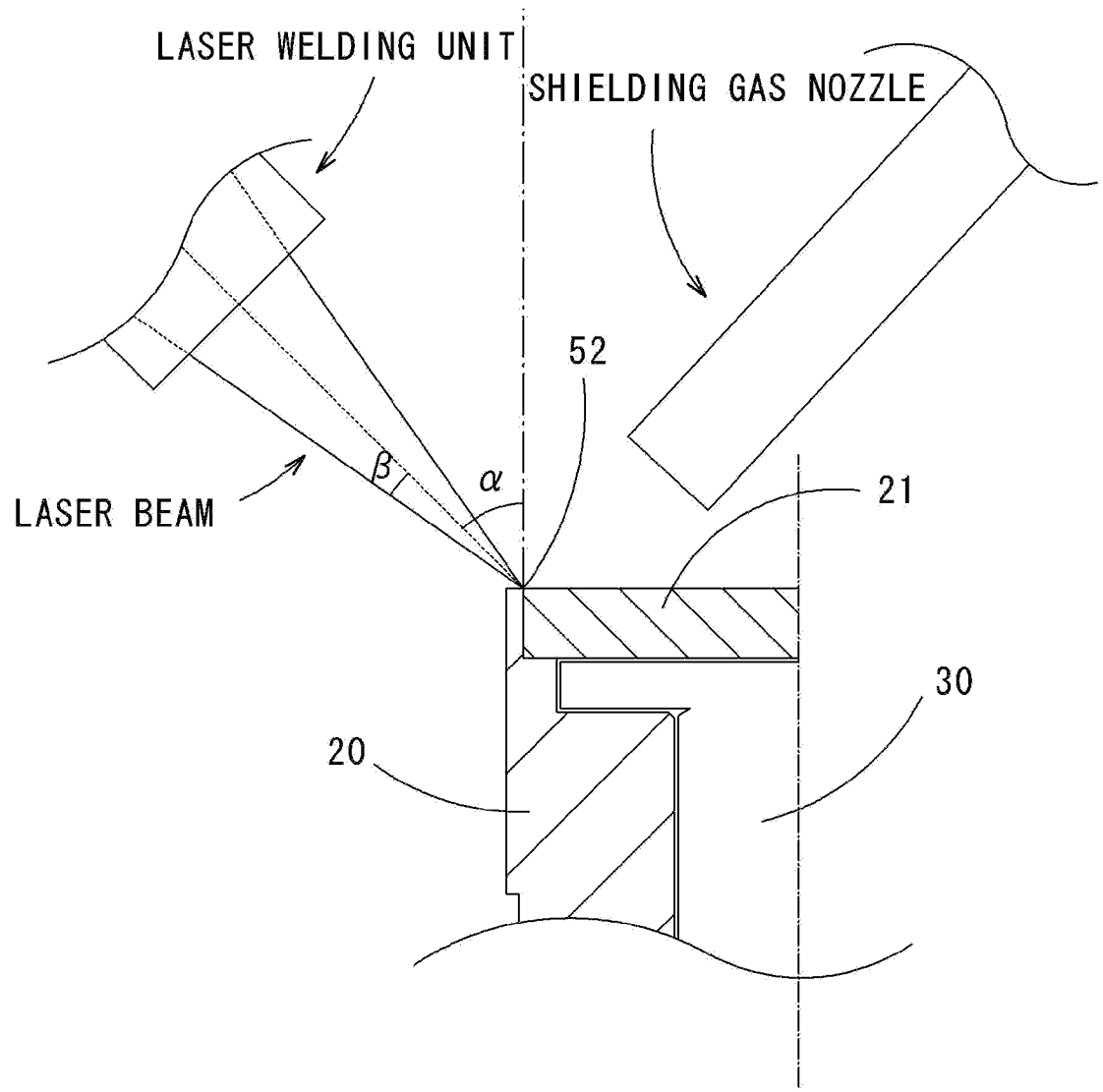
FIG. 13 is a schematic diagram showing a second modification of the first preferred embodiment of the present invention.

Also, as shown in FIG. 13, an angle of a laser used in the laser welding may be such that $0<\alpha \leqq (90-\beta)$ where $\alpha$ is defined by an illuminating angle of the laser and the central axis, and $\beta$ is the convergence angle of the laser.

Figure 14:
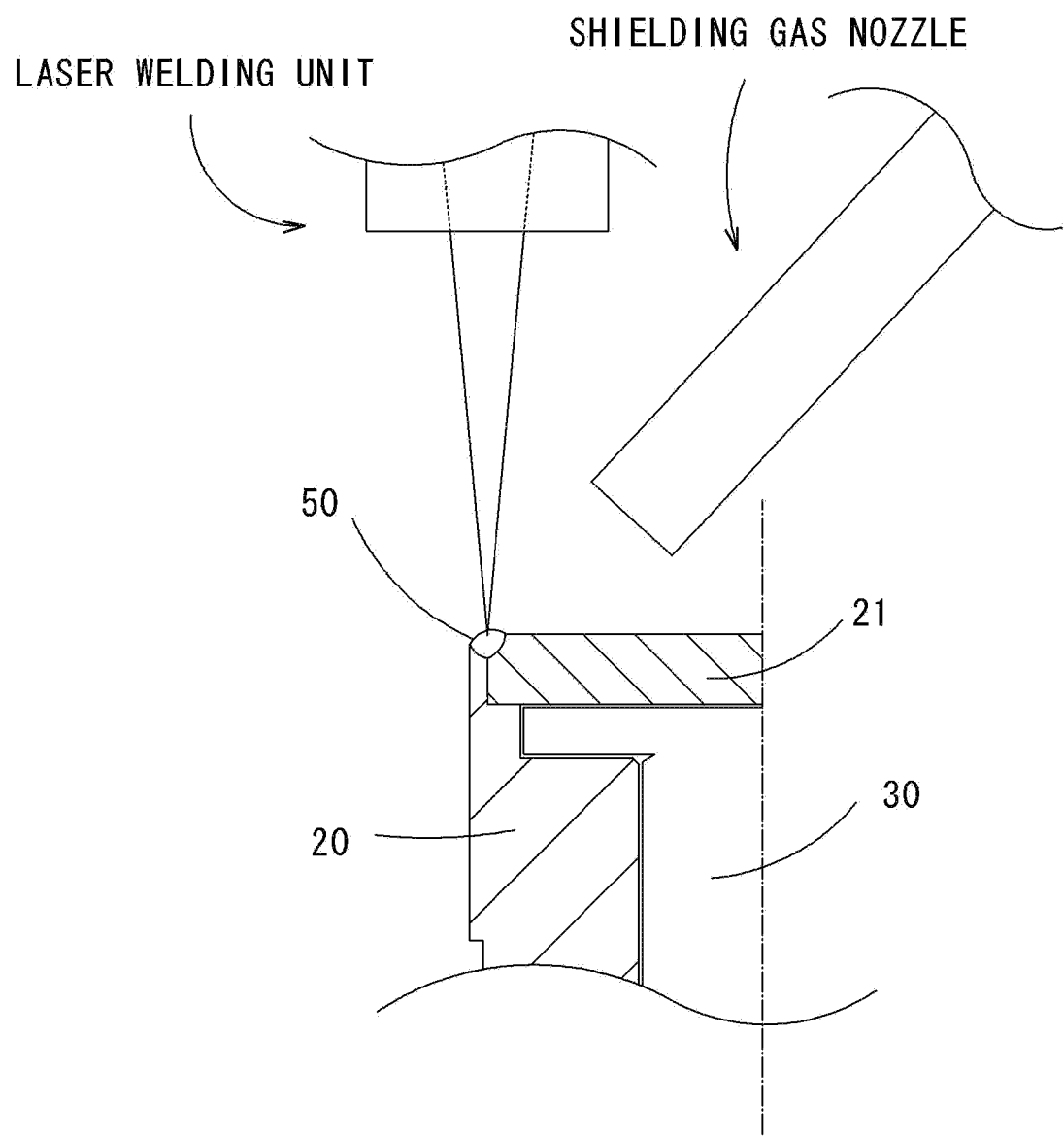
FIG. 14 is a schematic diagram showing a third modification of the first preferred embodiment of the present invention.

Also, although the preferred embodiments described above assume that the shielding gas is sprayed in the direction similar to the direction of the movement of the welding, the welding may be carried out while the shielding gas is sprayed to the welded portion from radially inward of the cover toward a radially outward direction as shown in FIG. 14. Also, a laser head may be arranged ahead of the portion being welding with respect to the direction of welding so as to minimize particles in the fumes adhering to the cover and/or to the bearing portion, which reduces the risk of contamination problems at the bearing mechanism.

What is claimed is:
1. A bearing mechanism comprising:
   a shaft;
   a bearing portion retaining a lubricant in a space between the shaft and the bearing portion, the bearing portion rotatably supporting the shaft concentrically about a central axis of the shaft; and a cover arranged to cover an end portion of a lower portion of the bearing portion in an axial direction; wherein the bearing portion includes a lower inner circumferential surface arranged opposite from an outer circumferential surface of the cover, and a bottom end surface extending continuously from the lower inner circumferential surface and in a radially outward direction;

a fitted portion is arranged between the bottom end surface of the bearing portion and the cover and includes a welded portion defined by a plurality of beads;

an inclined surface is provided at a surface of the welded portion such that the further from the central axis a portion of the inclined surface is, the axially higher the portion of the inclined surface is; and the bearing portion includes a notched portion extending from a radially outward location to a radially inward location at a same axial height as the cover.

2. The bearing mechanism according to claim 1, wherein the inclined surface includes a substantially convex shape when viewed perpendicularly to the central axis.

3. The bearing mechanism according to claim 1, wherein a portion of the bead of the welded portion makes contact with an outer circumferential edge of the bearing portion.

4. The bearing mechanism according to claim 1, wherein the bottom end surface is arranged axially above a bottom surface of the cover.

5. The bearing mechanism according to claim 1, wherein a radial width of the bottom end surface is smaller than a distance between a substantially central portion of the bead and an edge of the bead.

6. The bearing mechanism according to claim 1, wherein the substantially central portion of the bead is arranged above the bottom end surface.

7. The bearing mechanism according to claim 1, wherein the bearing portion includes a housing and a sleeve.

8. A spindle motor comprising:
the bearing mechanism according to claim 1;
a rotor magnet concentric with the shaft; and
a stator arranged radially opposite to the rotor magnet.

9. A data storage medium drive comprising:
a data storage medium;
the spindle motor according to claim 8; and
a case accommodating therein a head moving mechanism arranged to store and retrieve data with respect to the data storage medium.

10. A bearing mechanism comprising:
a shaft;
a bearing portion retaining a lubricant in a space between the shaft and the bearing portion, the bearing portion rotatably supporting the shaft concentrically about a central axis of the shaft; and a cover arranged to cover an end portion of a lower portion of the bearing portion in an axial direction; wherein the bearing portion includes a lower inner circumferential surface arranged opposite from an outer circumferential surface of the cover, and a bottom end surface extending continuously from the lower inner circumferential surface and in a radially outward direction;

a fitted portion is arranged between the bottom end surface of the bearing portion and the cover and includes a welded portion defined by a plurality of beads;

an inclined surface is provided at a surface of the welded portion such that the further from the central axis a portion of the inclined surface is, the axially higher the portion of the inclined surface is; and a portion of the plurality of beads of the welded portion makes contact with an outermost circumferential edge of the bearing portion.

11. The bearing mechanism according to claim 10, wherein the bearing portion includes a notched portion extending from a radially outward location to a radially inward location at a same axial height as the cover portion.

12. The bearing mechanism according to claim 10, wherein the inclined surface includes a substantially convex shape when viewed perpendicularly to the central axis.

13. The bearing mechanism according to claim 10, wherein a portion of the bead of the welded portion makes contact with an outer circumferential edge of the bearing portion.

14. The bearing mechanism according to claim 10, wherein the bottom end surface is arranged axially above a bottom surface of the cover.

15. The bearing mechanism according to claim 10, wherein a radial width of the bottom end surface is smaller than a distance between a substantially central portion of the bead and an edge of the bead.

16. The bearing mechanism according to claim 10, wherein the substantially central portion of the bead is arranged above the bottom end surface.

17. The bearing mechanism according to claim 10, wherein the bearing portion includes a housing and a sleeve.

18. A spindle motor comprising:
the bearing mechanism according to claim 10;
a rotor magnet concentric with the shaft; and
a stator arranged radially opposite to the rotor magnet.

19. A data storage medium drive comprising:
a data storage medium;
the spindle motor according to claim 18; and
a case accommodating therein a head moving mechanism arranged to store and retrieve data with respect to the data storage medium.

* * * * *